(12) United States Patent
Janikowski et al.

(10) Patent No.: US 8,631,550 B2
(45) Date of Patent: Jan. 21, 2014

(54) TOOL FOR ATTACHING/REMOVING A MOWER BLADE CUTTING INSERT

(75) Inventors: Randolph J. Janikowski, Hatley, WI (US); Paul E. Kratzke, Wittenberg, WI (US)

(73) Assignees: John D. Zogata, Hatley, WI (US); Randolph J. Janikowski, Hatley, WI (US)

( * ) Notice: Subject to any disclaimer, the term of this patent is extended or adjusted under 35 U.S.C. 154(b) by 90 days.

(21) Appl. No.: 13/100,545

(22) Filed: May 4, 2011

(65) Prior Publication Data

US 2012/0279032 A1    Nov. 8, 2012

(51) Int. Cl.
*B25B 27/14*    (2006.01)

(52) U.S. Cl.
USPC ........... 29/275; 56/DIG. 9; 56/249.5; 24/460; 24/462; 81/44; 81/488

(58) Field of Classification Search
USPC ........... 29/253, 257, 275, 244, 255, 278, 280, 29/276; 81/44, 488; 7/100; 24/460, 462; 403/263, 329, 353; 56/10.4, 12.7, 56/249.5, 255, 295, DIG. 9
See application file for complete search history.

(56) References Cited

U.S. PATENT DOCUMENTS

| | | | | |
|---|---|---|---|---|
| 2,080,593 | A * | 5/1937 | Albert | 52/800.12 |
| 5,978,987 | A * | 11/1999 | Wang | 5/99.1 |
| 6,182,430 | B1 | 2/2001 | Blarek et al. | |
| 6,722,722 | B1 * | 4/2004 | Sturt et al. | 296/97.9 |
| 2010/0084411 | A1 * | 4/2010 | Lien | 220/592.16 |
| 2010/0229370 | A1 * | 9/2010 | Oddsen Jr. | 29/527.5 |
| 2012/0110970 | A1 * | 5/2012 | Blarek | 56/295 |

* cited by examiner

*Primary Examiner* — Joseph J Hail
*Assistant Examiner* — Henry Hong
(74) *Attorney, Agent, or Firm* — Andrus, Sceales, Starke & Sawall, LLP

(57) ABSTRACT

An impact tool for removal and attachment of a mower blade cutting edge insert of the type demountably attached with a press fit wedging connection in a recessed end surface of the mower blade, the tool body having a U-shaped slot permitting the slot to receive and straddle adjacent edges of the mower blade and the insert when the latter is in the recessed end surface portion, sliding movement of the tool along the edges causes a contacting abutment in the bottom of the U-shaped slot to engage one or the other ends of the edge insert to drive the insert into or detach it from an operative press fit attachment.

6 Claims, 3 Drawing Sheets

TOOL FOR ATTACHING/REMOVING A MOWER BLADE CUTTING INSERT

BACKGROUND

The present invention pertains to blades for rotary lawn-mowers and, more particularly, to a tool useful in attaching a cutting blade insert to a mower blade and for removing the insert after it has worn or become damaged.

Rotary lawnmower blades in which the blade cutting edge is made as a separate insert are well known in the art. Such a cutting edge insert is shown, for example, in U.S. Pat. No. 6,182,430. The mower blade itself may be of a conventional construction, being long and narrow and relatively thin with a cutting edge insert attached to the blade body at opposite ends and with oppositely oriented cutting edges. The blade edge insert is typically received in a shallow recess on the underside of the mower blade body and is secured in the recess with a sliding and wedging press fit connection where the insert is held against the undersides of headed connectors, such as rivets, that extend perpendicular from the flat face of the recess. The blade edge insert is provided with a number of linearly aligned key hole slots that receive the headed connectors after which the insert is tapped or pushed to force the insert into wedging engagement with the undersides of the connector heads. This establishes the fully attached position of the insert.

When the blade edge insert becomes dull or damaged, it can be easily replaced, instead of having to replace the entire blade body. The blade edge insert is removed by moving it in the opposite linear direction in the shallow recess by tapping the insert and causing it to slide from under the connector heads and release the wedging press fit engagement by which the insert is held. Tools are required both to attach the insert and to remove it, one typical method being to tap or drive the insert in the desired direction with a screw driver or chisel and a hammer. This is oftentimes a difficult and potentially dangerous task because the mower blade and cutting edge are not always readily accessible and the cutting insert itself may not have a removal and attachment contact surface easily reached by the tip of a screw driver or chisel.

In addition, the blade cutting edge insert often gets jammed more tightly in its attached position due to grass, dirt and other debris being jammed into crevices or openings between the blade body and the insert. Also, inadvertent contact by the blade edge with obstacles on the ground may cause additional jamming or distortion of the insert, making it very difficult to remove.

Although a number of tools have been proposed for the removal and attachment of a blade cutting edge insert, none has proved to be particularly useful. One of the problems with using a screw driver or chisel and hammer is that inadvertent slipping of the tools may bring the user into contact with the sharp cutting edge of the insert.

SUMMARY

In accordance with a basic embodiment of the invention, a removal and attachment tool for a mower blade cutting edge insert of the type demountably attached with a wedging press fit connection in a recessed end surface portion of a long, flat-bodied mower blade and held therein by headed connectors, includes a tool comprising an elongate body that has a length greater than the length of the cutting edge insert, the body having a generally, but not necessarily, U-shaped slot extending lengthwise through the body. The actual shape of the body, as indicated, does not have to be U-shaped, but for example, could be rectangular, V-shaped or some other shape so long as it straddles and covers the insert. The slot dimensioned to receive and straddle an edge of the blade and the insert when the insert is in the recessed end surface portion of the blade, and an insert contacting abutment at the bottom of the U-shaped slot and adjacent one end thereof, the abutment adapted to make impacting contact with one end of the insert when the tool is slid manually along the blade edge and attached insert, in one direction, to release the wedging connection, and the abutment adapted to make impacting contact with the other end of the insert when the tool is slid manually along the blade edge and unattached insert in the opposite direction to make the wedging connection.

Preferably, the tool is provided with a pair of insert contacting abutments in the bottom of the U-shaped slot, the abutments spaced apart by a distance greater than the end-to-end length of the insert. More preferably, the abutments are positioned at opposite ends of the U-shaped slot. The tool body is preferably made of steel and the abutments are formed by weld material deposited in the slot or suitably hard and dense material attached in any manner. Alternately, and more preferably, the abutments comprise steel buttons welded to the body at the opposite bottom ends of the slot.

More specifically, a removal and attachment tool for the mower blade cutting edge insert of the type demountably attached with a sliding and wedging press fit connection in a recessed end surface portion of a generally elongate and flat-bodied mower blade and held therein against the undersides of headed connectors that extend perpendicularly from the recessed end surface portion, the removal and attachment tool including:

a tool body that has a length greater than the length of the cutting edge insert, the tool body having a generally U-shaped slot that extends the entire length of the body and is dimensioned to receive and straddle an edge of the mower blade and the insert when the insert is in the recessed end surface portion of the blade, and an insert contacting abutment at the bottom of the U-shaped slot and adjacent one end thereof, which abutment is adapted to make impacting contact with one end of the insert when the tool is slid manually along the blade edge and attached insert in one direction to move the insert from the undersides of the connectors and release the wedging press fit connection, the abutment adapted to make impacting contact with the other end of the insert when slid manually in the opposite direction along the blade edge and unattached insert to move the insert into contact with the connectors and make the wedging connection.

The tool body may be made of any suitable hard and durable material, preferably of a material having a high density or mass. Preferably, the tool body is made of steel. Preferably, also, a pair of contacting abutments are provided that are spaced apart by a distance greater than the end-to-end length of the insert in the direction of sliding movement. The tool body is longer than the recessed end surface portion of the blade in the direction of sliding movement.

DETAILED DESCRIPTION OF THE PREFERRED EMBODIMENT

Figure 1:
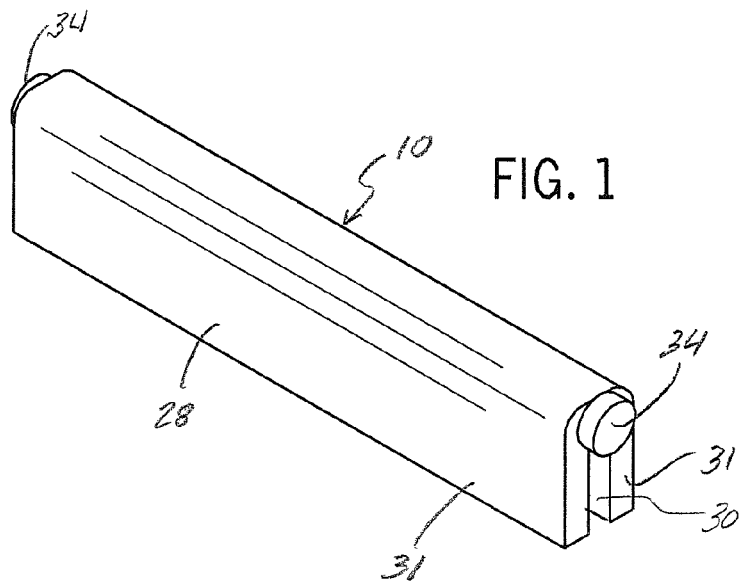
FIG. 1 is a perspective view of a removal and attachment tool of the present invention.
Figure 2:
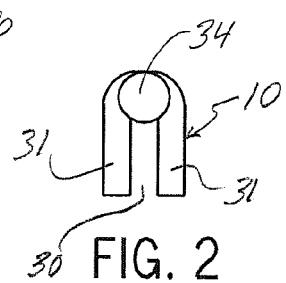
FIG. 2 is an end view of the tool shown in FIG. 1.
Figure 3:
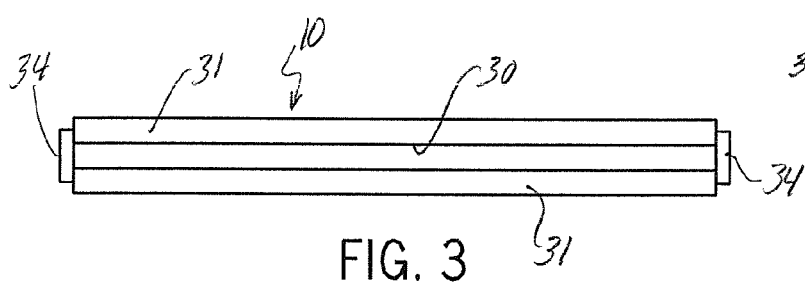
FIG. 3 is a bottom view of the tool.

A removal and attachment tool 10 is used to remove and attach a mower blade cutting edge insert 11 to one end of a conventional rotary mower blade 12. The insert 10 is demountably attached to the mower blade 12 with a sliding and wedging connection that provides a press fit in a recessed end surface portion 13 of the blade which has a generally elongate and flat body 14 of more or less conventional shape. The cutting edge insert 11 is held in the recessed portion 13 of the blade and secured therein against the undersides of headed connectors 15 that extend perpendicular from the recessed end surface portion 13.

The recessed end surface portion 13 of the blade 12 is on the underside of the blade when it is operatively attached to the mower. The cutting edge insert 11 is flat and seats in the recessed portion 13 so that the outer surface of the insert is flush with the non-recessed surface of the blade 12. The headed connectors 15, in the embodiment shown, comprise rivets 16 that have their shanks 17 pressed into recess surface portion 13 and enlarged heads 18 that are spaced above the recessed surface. The cutting edge insert 11 is provided with a number of key hole slots 20 which have circular ends 21 large enough to allow the rivet heads 18 to pass therethrough and narrow ends 22 defined by recessed edges 23 that permit the rivet shanks 17 to be engaged by the recessed edges 23 as the edge insert 11 moves from the unattached position on the left end of FIG. 4 to the attached position on the right end of FIG. 4. When fully attached, the rivet shanks 17 bottom in the narrow end slot 22 as shown.

Figure 4:
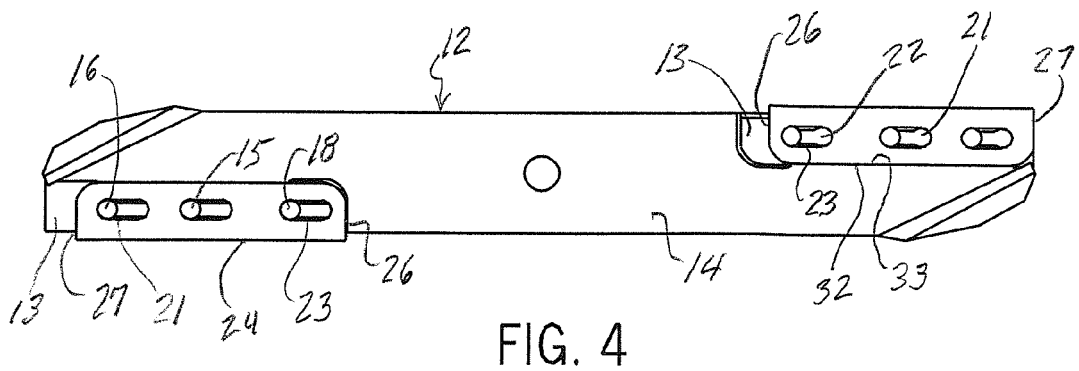
FIG. 4 is a bottom plan view of a mower blade showing the cutting edge inserts that are demountably attached to the blade.

As indicated above, an impact against the end of the cutting edge insert 11 is necessary to slide the insert over the flat recessed end surface portion 13 of the blade to attach the insert to the blade (FIG. 4). Correspondingly, an impact against the opposite end of the edge insert 11 is necessary to overcome the press fit and move the insert to the unattached position (also shown in FIG. 4). The cutting edge 24 of the edge insert 11 extends laterally away from the edge 25 of the blade body 14 so as to present the cutting edge to the grass being cut. The edge insert also has opposite inner and outer edge portions 26 and 27 on opposite ends that extend perpendicular to the cutting edge 24 and which present abutment surfaces that can be engaged by an attachment or unattachment (removal) tool. In the industry, attachment and removal of the cutting edge insert 11 is typically done by placing the tip of a screw driver or a chisel against the opposite edge portion 26 or 27 and striking the screw driver handle with a hammer or the like. However, not only are the edge portions 26 and 27 of the insert often difficult to access, but the screw driver and/or hammer are prone to slip in the attachment or removal of the insert, exposing the fingers, hand or wrist of the operator to engagement by the sharp cutting edge 24.

Figure 8:
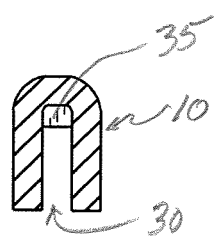
FIG. 8 is a sectional view through the tool showing another embodiment of the impact abutment.

Applicant's removal and attachment tool 10 is intended to resolve all of the problems and hazards associated with edge insert attachment and removal. The tool is preferably made of steel and has a body 28 that has a length greater than the length of the cutting edge insert 11. The body has a generally U-shaped slot that extends lengthwise through the body 28. The slot 30 is dimensioned to receive and straddle the edge 25 of the blade body 14 and the insert 11 when the insert is placed in the recessed surface portion 13 of the blade. The legs 31 of the U-shaped slot 30 are preferably just long enough to extend past the inner edge 32 of the insert and the abutting face 33 of the recessed surface portion 13. At least one end of the tool 10 is provided with an impact button 34 attached at the end of the slot 30 and covers the bottom of the slot. An identical impact button may be attached to the opposite end of the tool, but only a single impact button is required as the tool 10 is reversible. Instead of an impact button or buttons, a contacting abutment may be provided by depositing a small amount of weld material 35 in the bottom of the U-shaped slot at one or both ends. A sectional view through the tool 10 using this embodiment is shown in FIG. 8.

Figure 9:
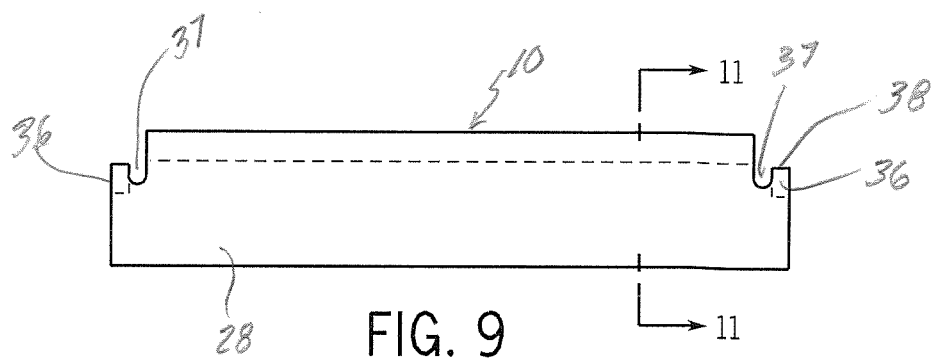
FIG. 9 is a side elevation view of a tool showing another embodiment of the impact abutment.
Figure 10:
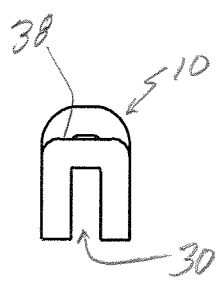
FIG. 10 is an end view of the tool shown in FIG. 9.
Figure 11:
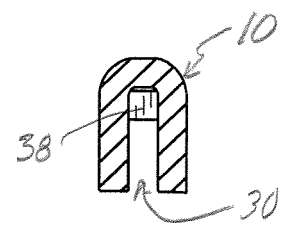
FIG. 11 is a sectional view through the tool taken on line 11-11 of FIG. 9.

In a presently preferred embodiment of the impact abutments, shown in FIGS. 9-11, the abutments 36 are formed by displacing the abutments from a small amount of material at the ends of the tool 10. More specifically, the ends of the tool 10 at the bottom of the U are first notched as at 37 and then the narrow rims of material 38 at the very ends of the tool are deformed to provide the displaced impact abutments 36. The impact abutments engage the ends of the cutting edge insert 11 in the same manner described with respect to the impact buttons 34 and weld material abutments 35.

Figure 5:
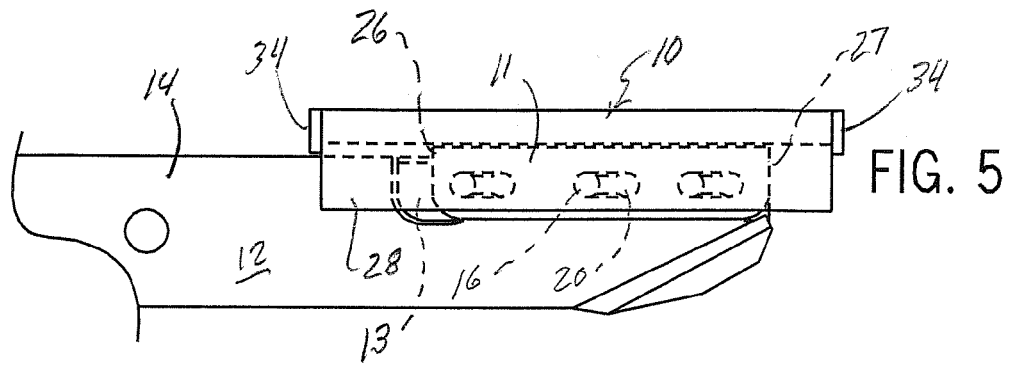
FIG. 5 is a side view of the removal and attachment tool positioned on one end of the blade with the cutting edge insert attached thereto.
Figure 6:
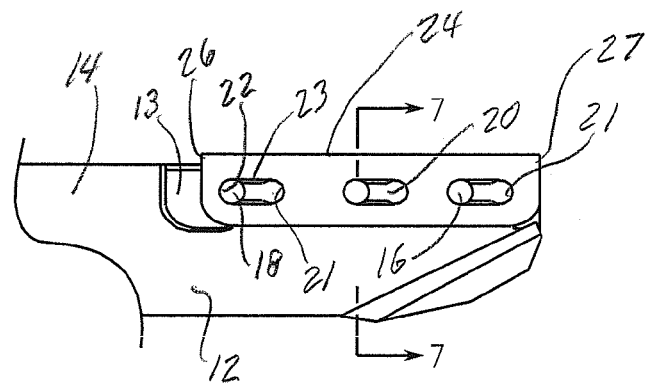
FIG. 6 is an enlarged detail of one end of the mower blade and insert shown in FIG. 4.
Figure 7:
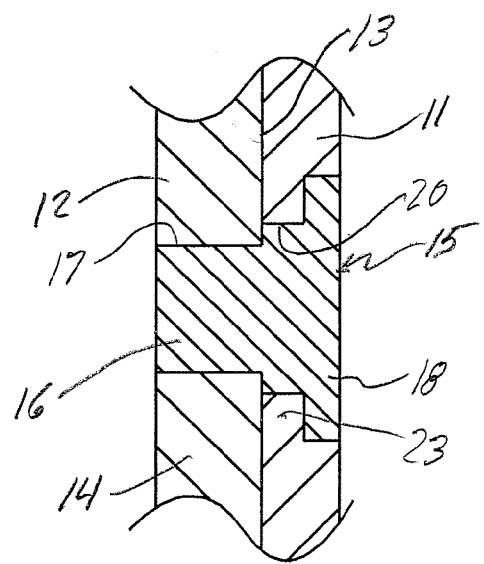
FIG. 7 is an enlarged cross sectional view taken on line 7-7 of FIG. 6.

To remove the edge insert 11 from its attached position on the right hand side of FIG. 4 and in FIG. 6, the tool 10 is placed to straddle the edge 44 of the blade body 14 and the insert 11. If the tool has only a single impact button 34, weld material 35 or displaced abutments 36, the tool is oriented with the impact port on the outer end of the assembly, as shown in FIG. 5. The operator slides the tool in its straddling position until the impact button 34, weld 35 or abutment 36 strikes the outer edge portion 27 of the insert, overcoming the press fit wedging of the insert and moving it to the unattached position shown on the left in FIG. 4. In the unattached position, the insert may be lifted past the heads 18 of the rivets 16 for replacement or resharpening. Attachment of the edge insert 11 to the blade 12 is done in the exact opposite manner, sliding the tool along the edge 25 of the blade body and the cutting edge 24 of the insert and causing the impact button 34 to strike the inner edge portion 26 of the insert, driving it to the fully attached position with the narrow end of the key hole slot 20 in engagement with the rivet shanks 17.

Although any tough, high density material may be used for the removal and attachment to tool 10, steel is preferred. The impact buttons are also preferably made of steel and welded into position to partially close the U-shaped slot on one or both ends. The steel material may be 11 GA. (3/16 inch) plate that is die formed to the U-shape. If a weld material deposit is used to provide contact abutments, instead of using impact buttons 34 or displaced abutments 36, the contacting abutments could be placed inside the U-shaped slot 30 as long as they are spaced apart by a distance greater than the end-to-end length of the insert in the direction of sliding movement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various alternatives and embodiments are contemplated as being within the scope of the following claims, particularly pointing out and distinctly claiming the subject matter of the present disclosure.

What is claimed is:

1. A method for removal and attachment of a mower blade cutting edge insert of the type demountably attached with a wedging press fit connection in a recessed end surface portion of a generally elongate and flat-bodied mower blade and held therein by headed connectors, the method comprising the steps of:

providing a tool with an elongate body having a length greater than the length of the cutting edge insert, the body having a generally U-shaped slot extending lengthwise through the body, the slot dimensioned to receive and straddle an edge of the blade and the insert when the insert is in the recessed end surface portion of the blade; and, providing an insert contacting abutment at the bottom of the U-shaped slot and adjacent one end thereof;

sliding the tool manually along the blade edge and attached insert in one direction and causing the abutment to make impacting contact with one end of the insert to release the wedging connection; and, sliding the tool manually along the blade edge and unattached insert in the opposite direction and causing the abutment to make impacting contact with the other end of the insert to make the wedging connection.

2. The method as set forth in claim 1 comprising the steps of:

providing a pair of insert contacting abutments in the bottom of the U-shaped slot; and, spacing the abutments apart by a distance greater than the end-to-end length of the insert.

3. The method as set forth in claim 2 including the step of positioning the abutments at the opposite ends of the U-shaped slot.

4. The method as set forth in claim 3 including the steps of fanning the tool body from steel and forming the abutments from weld material deposited in the slot.

5. The method as set forth in claim 3 including the steps of fanning the tool body from steel and forming the abutments by welding steel buttons to the body at the opposite bottom ends of the slot.

6. The method as set forth in claim 3 including the steps of forming the abutments by deforining and displacing end portions at the opposite bottom ends of the slot.

* * * * *